Figure 1:
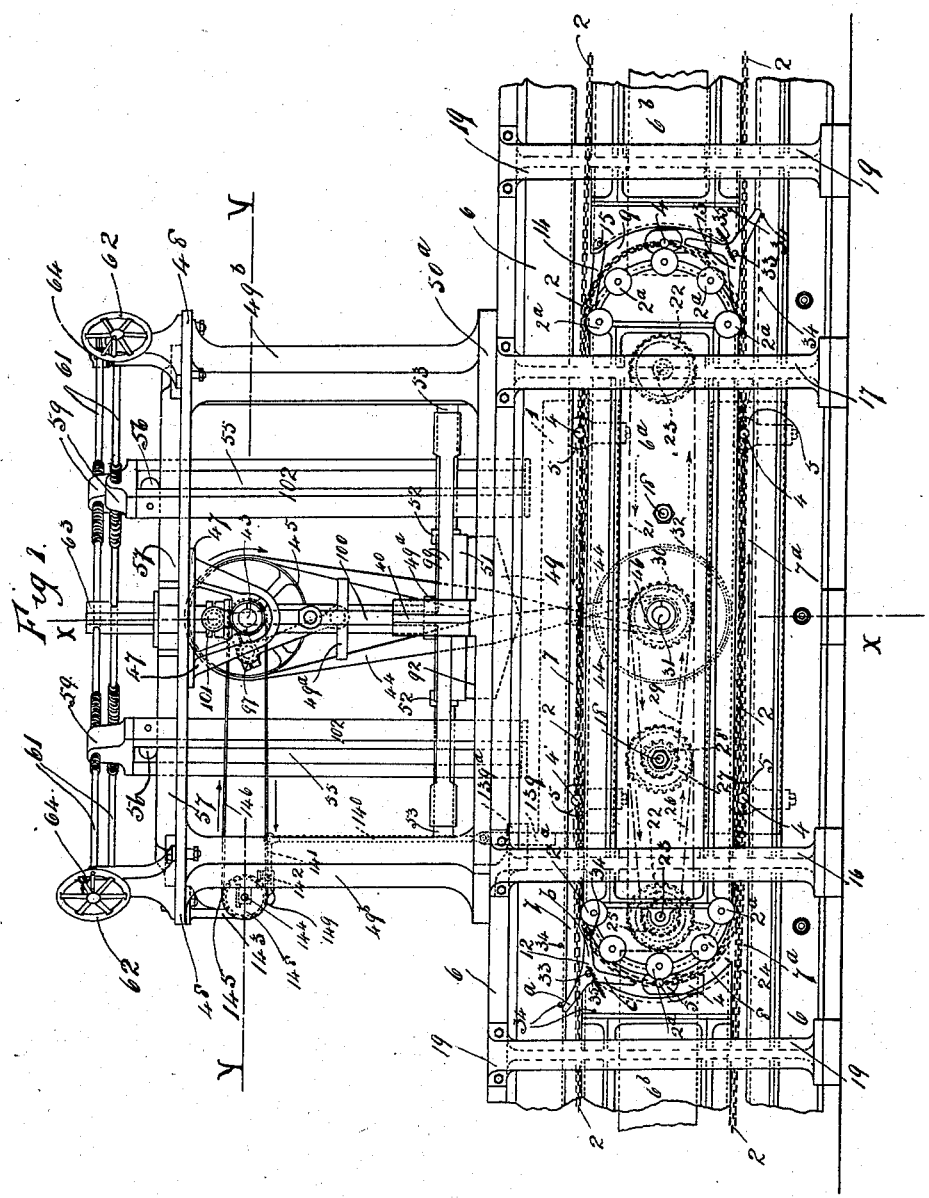

No. 666,142. Patented Jan. 15, 1901.
W. L. JACKSON.
MACHINE FOR MAKING LEATHER BOARD OR CARDBOARD BOXES.
(Application filed Mar. 22, 1900.)
(No Model.) 7 Sheets—Sheet 1.

No. 666,142. Patented Jan. 15, 1901.
W. L. JACKSON.
MACHINE FOR MAKING LEATHER BOARD OR CARDBOARD BOXES.
(Application filed Mar. 22, 1900.)
(No Model.) 7 Sheets—Sheet 2.

Witnesses:
W. C. Pinckney
C. Holloway

Inventor:
William Leonard Jackson
By Edmund Cougar Brown
Attorney

No. 666,142. Patented Jan. 15, 1901.
W. L. JACKSON.
MACHINE FOR MAKING LEATHER BOARD OR CARDBOARD BOXES.
(Application filed Mar. 22, 1900.)
(No Model.) 7 Sheets—Sheet 3.
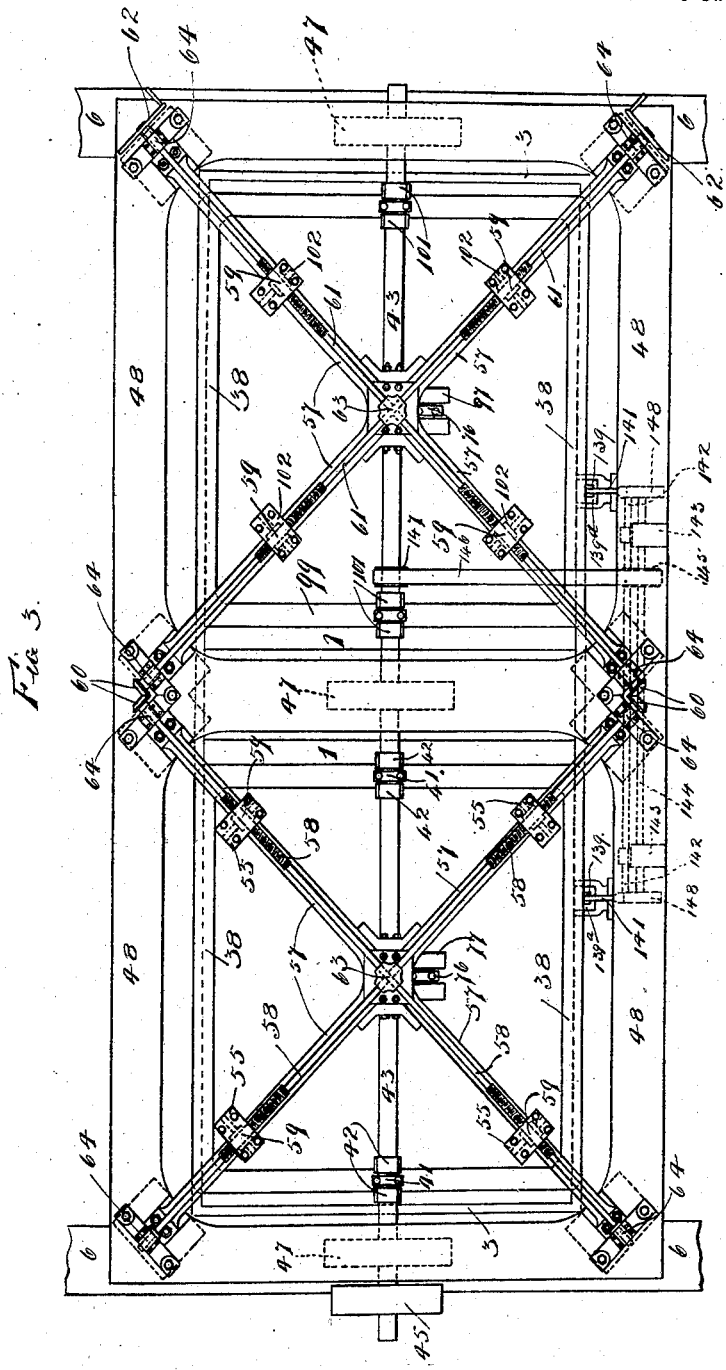

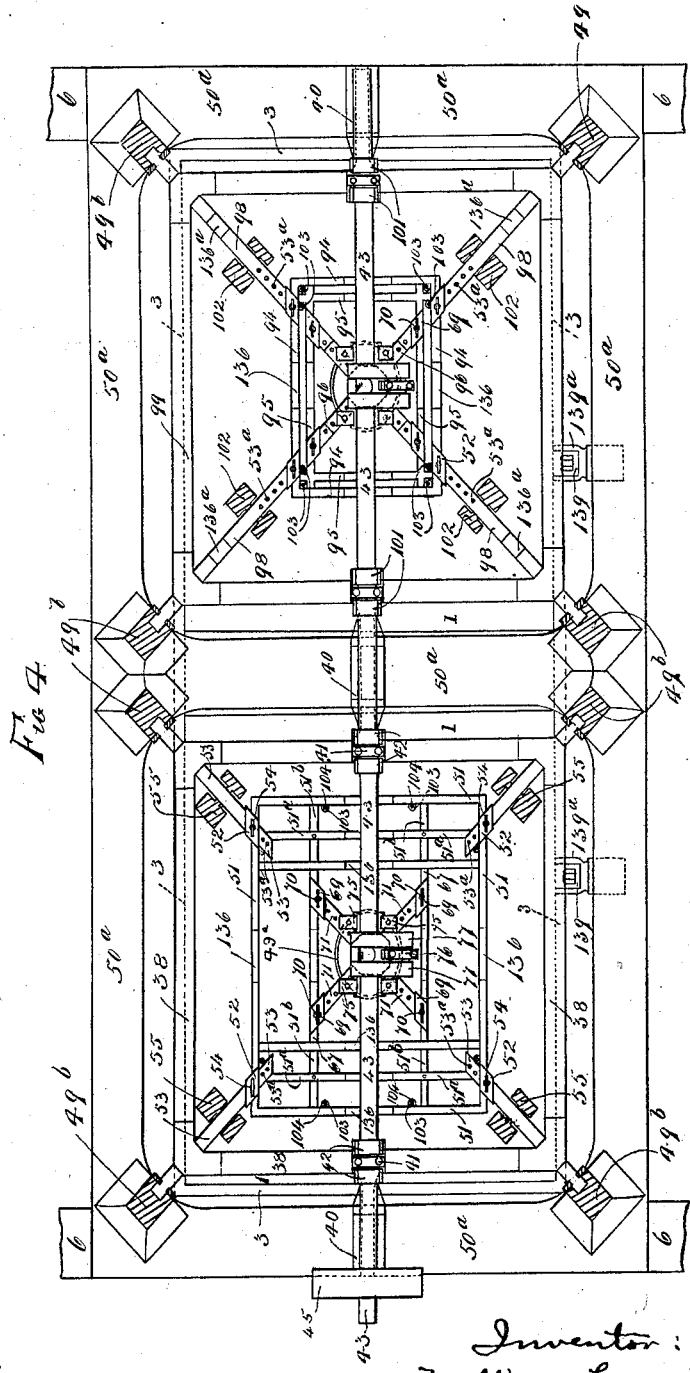

No. 666,142. Patented Jan. 15, 1901.
W. L. JACKSON.
MACHINE FOR MAKING LEATHER BOARD OR CARDBOARD BOXES.
(Application filed Mar. 22, 1900.)
(No Model.) 7 Sheets—Sheet 5.
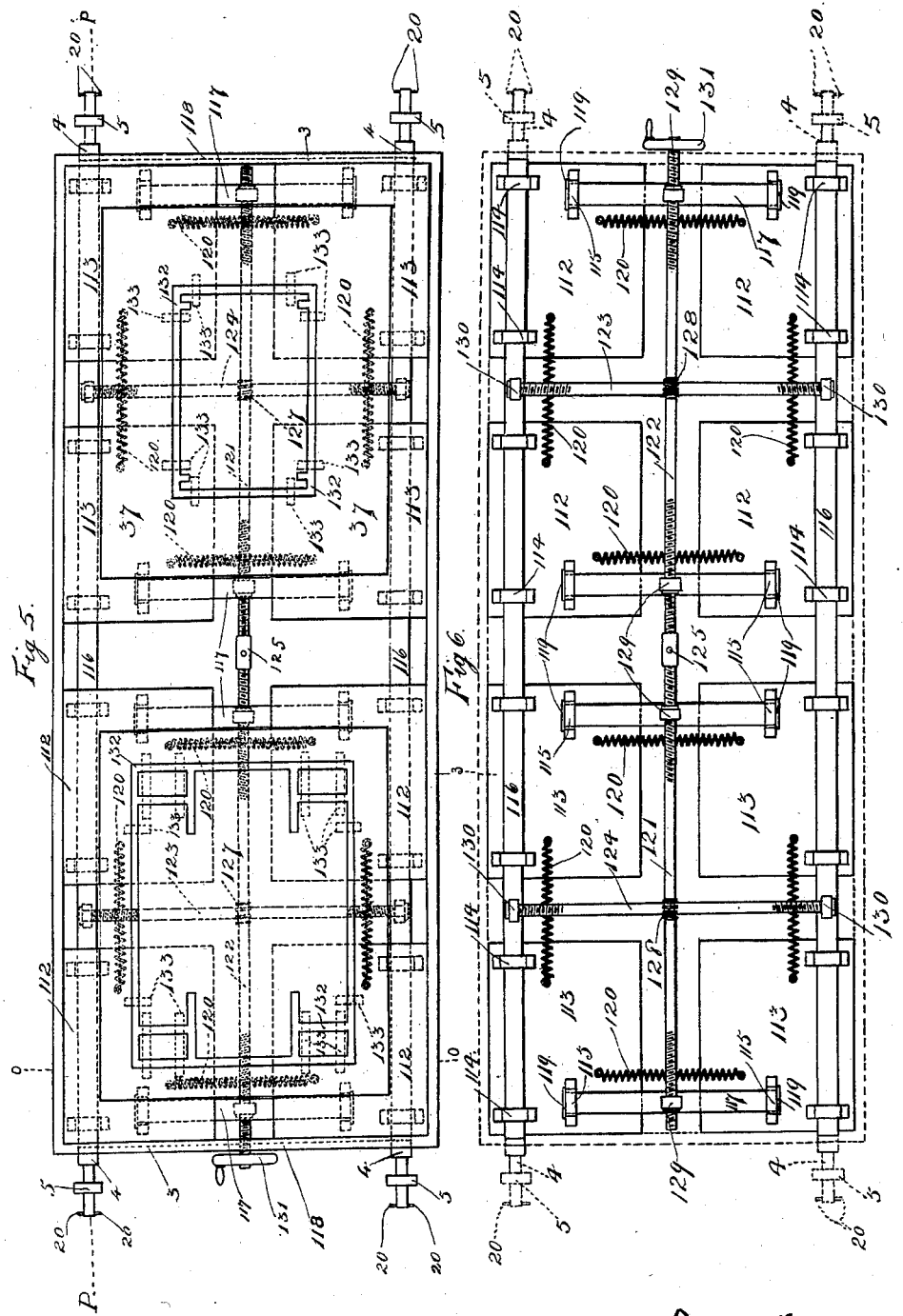
Witnesses:
W. C. Pinckney
C. Holloway
Inventor:
William Leonard Jackson
By Edmund Congar Brown
Attorney No. 666,142. Patented Jan. 15, 1901.
W. L. JACKSON.
MACHINE FOR MAKING LEATHER BOARD OR CARDBOARD BOXES.
(Application filed Mar. 22, 1900.)
(No Model.) 7 Sheets—Sheet 6.
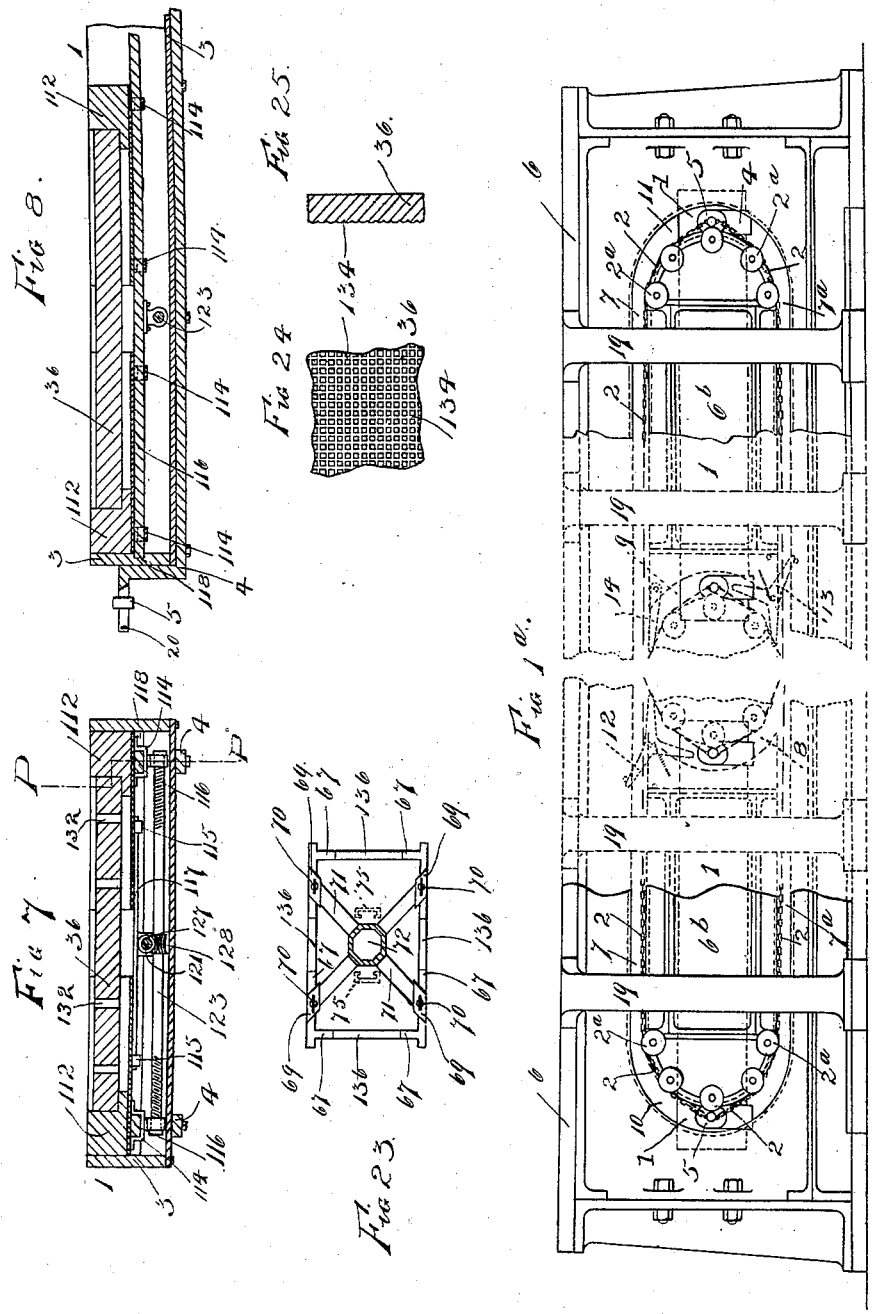
Witnesses:
W. C. Pinckney
C. Holloway
Inventor:
William Lennard Jackson
By
Edmund Conger Brown
Attorney No. 666,142. Patented Jan. 15, 1901.
W. L. JACKSON.
MACHINE FOR MAKING LEATHER BOARD OR CARDBOARD BOXES.
(Application filed Mar. 22, 1900.)
(No Model.) 7 Sheets—Sheet 7.
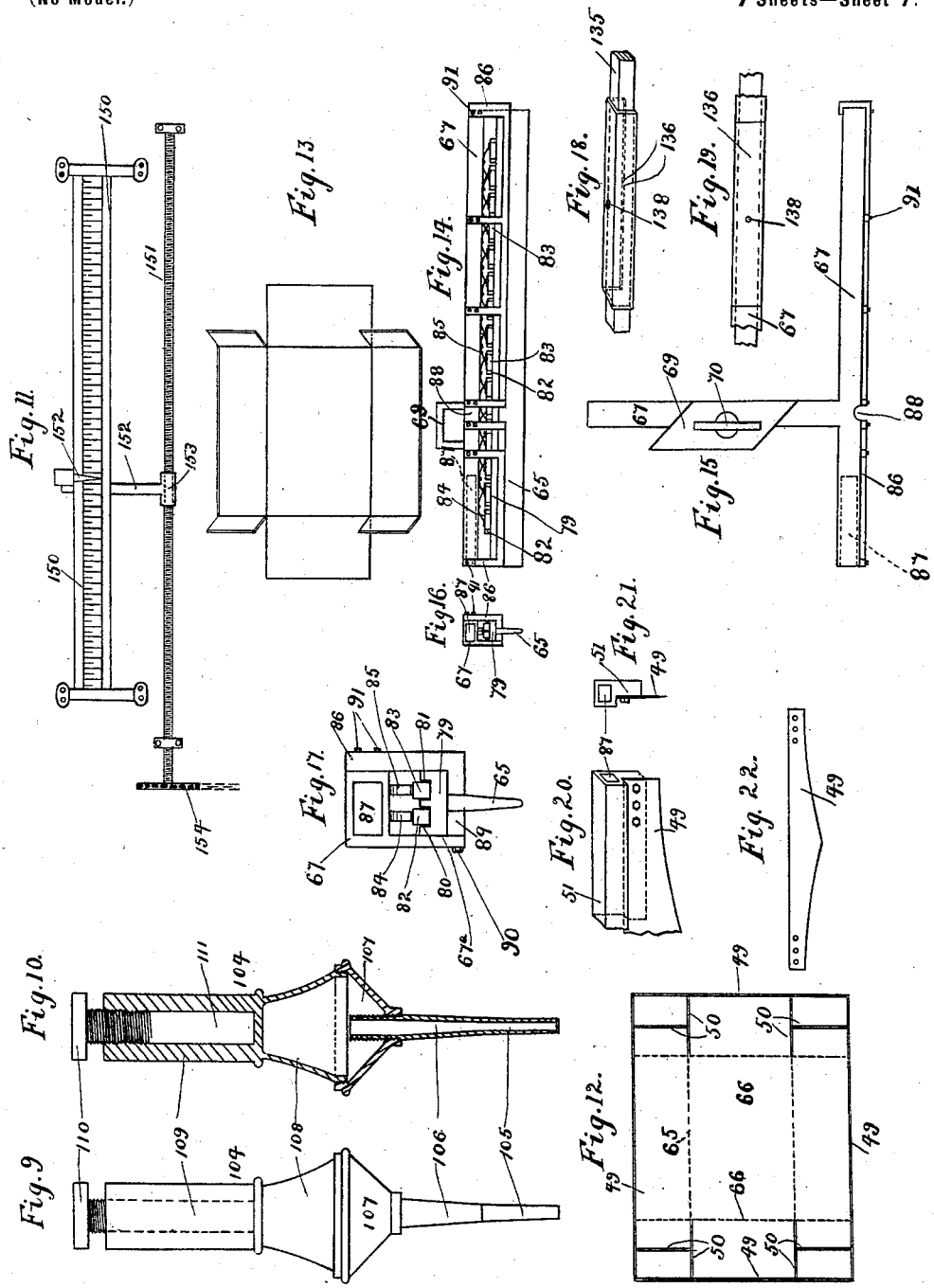

UNITED STATES PATENT OFFICE.

WILLIAM L. JACKSON, OF EDINBURGH, SCOTLAND.

MACHINE FOR MAKING LEATHER-BOARD OR CARDBOARD BOXES.

SPECIFICATION forming part of Letters Patent No. 666,142, dated January 15, 1901.

Application filed March 22, 1900. Serial No. 9,670. (No model.)

*To all whom it may concern:*

Be it known that I, WILLIAM LENNARD JACKSON, box manufacturer, a subject of the Queen of Great Britain, residing at 39 South Bridge, Edinburgh, Scotland, have invented certain new and useful Improvements in Machinery for Making Leather-Board, Cardboard, or Like Boxes, of which the following is a specification.

My invention relates to machinery for the manufacture of leather-board, cardboard, and like boxes; and it has for its object to improve the construction of such machinery.

Generally when manufacturing leather-board and like boxes a good deal of hand manipulation is necessary, while the leather-board blanks have to be taken from one machine to another in order to have the various steps in the process of manufacture carried out. Under my invention a single improved machine suffices for carrying out the various steps of cutting, bending, punching, &c., and these various steps are all performed automatically by the machine.

The machine comprises mechanism for automatically feeding the leather-board or like blanks to be operated upon and automatically delivering the finished blanks, mechanism for cutting and bending or scoring the leather-board or like blanks, mechanism for punching the blanks, mechanism for expanding and contracting the feeding-tables and also mechanism whereby the knives and benders can be expanded and contracted in a corresponding proportion, and mechanism for retaining each feeding-table in position when the blanks thereon are being acted on by the cutters and benders. Mechanism operated by power is also provided for driving the various parts of the machine, and this mechanism may be of any suitable and well-known construction. If desired, mechanism for recording the number of boxes made by the machine may be provided, and this mechanism may be of any suitable and well-known construction.

In order that my said invention may be properly understood, I have hereunto appended seven explanatory sheets of drawings, whereon—

Figure 2:
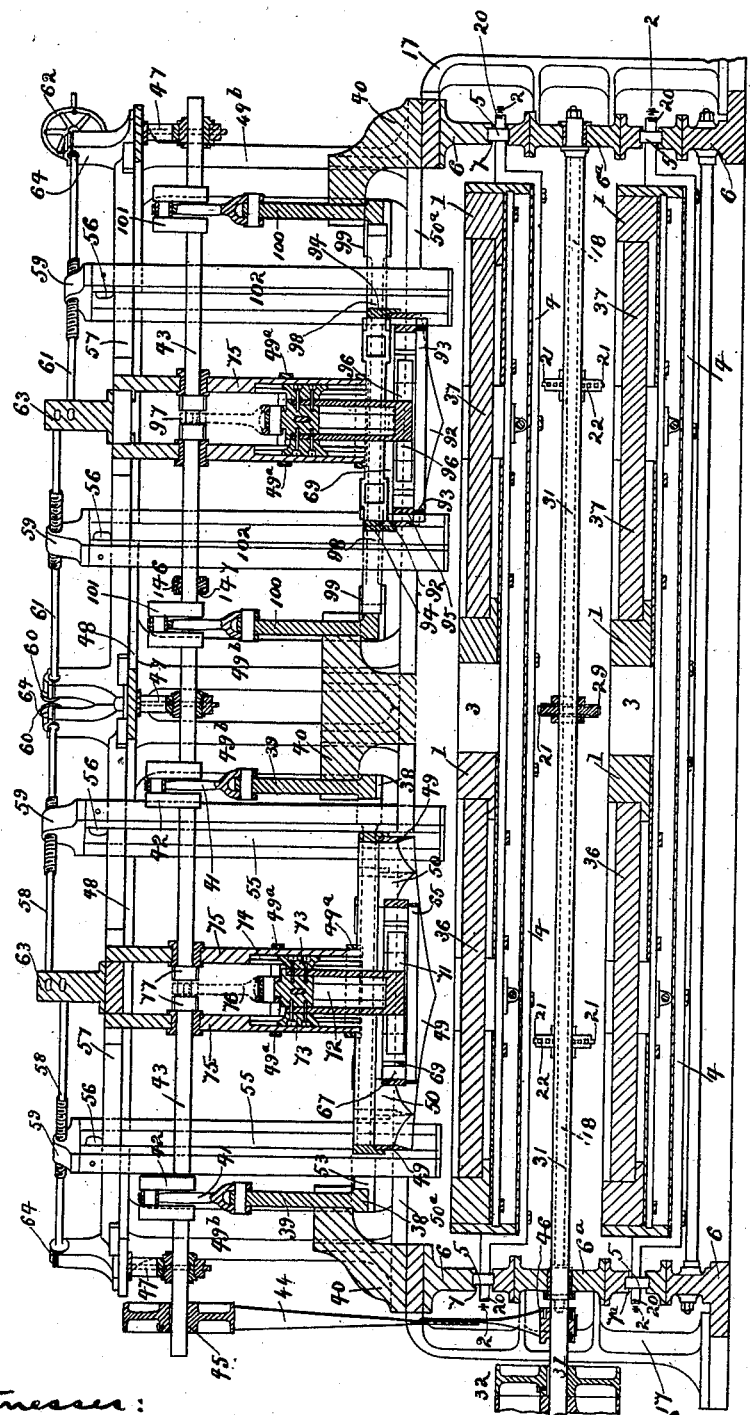

Figure 1 is a part side elevation of the machine. Fig. 1ᵃ is a view of the ends of the machine and completes the view Fig. 1. Fig. 2 is a cross-section of the machine, taken on the line X X, Fig. 1. Fig. 3 is a plan view of the central part of the machine. Fig. 4 is a sectional plan taken on the line Y Y, Fig. 1, and showing the mechanism for operating the knives and benders. Fig. 5 is a plan view of one of the traveling tables. Fig. 6 is an inverted plan view of one of the traveling tables with its outer casing and cutting-blocks removed. Fig. 7 is a section of a table on the line O O, Fig. 5. Fig. 8 is a part section of a table on the line P P, Figs. 5 and 7. Fig. 9 is a side elevation, and Fig. 10 a section, of a punch. Fig. 11 is a view of an indicating-gage. Fig. 12 is a diagram showing how the knives and benders are arranged. Fig. 13 is a view of a finished box-blank with two sides partly turned up. Fig. 14 is a front view, Fig. 15 a plan, and Fig. 16 an end view, of a bender. Fig. 17 is an enlarged end view of the bender. Figs. 18 and 19 are detail views. Fig. 20 is a perspective view, and Fig. 21 is an end view, of a knife and knife-holder. Fig. 22 is a view of a knife. Fig. 23 is a detail view. Fig. 24 is a plan, and Fig. 25 a side view, of part of a block for the tables.

On the drawings the same reference characters wherever repeated indicate the same or similar parts.

The mechanism for feeding the leather-board or like blanks to the machine for holding the blanks in position while being operated on and for delivering the finished blanks consists of a series of tables 1, connected together by means of chains 2 or their equivalent in such manner as to form an endless chain of tables. Each table has a casing 3, provided with strong cross-bars 4, whose ends have buttons or shoes 5 fitted movably thereon. As will be seen, there are four buttons or shoes to each table, two at each side, and they work slidably in slots made in the side frames 6 of the machine. At each side of the machine there are two parallel longitudinal and horizontal slots 7 7ᵃ, which are connected together at the ends by inner curved slots 8 9 and outer curved slots 10 11. At the junction between the upper slot 7 and the curved slot 8 there is a movable star-shaped switch 12, arranged for the purpose of guiding the buttons or shoes of each table. At the junction between the lower slot $7^a$ and the curved slot 9 there is a similar switch 13. At the junction between the curved slot 9 and the horizontal slot 7 there is a hinged guide 14. This guide is hinged at 15 to the side frame, and when in the horizontal position (shown at Fig. 1) its front end rests upon a projection on the side frame.

It will be seen that the central part $6^a$ of each side frame is surrounded by the slots, and it is supported by the standards 16 17. The parts $6^a$ of the side frames are connected together by stays 18.

19 represents side standards for supporting the side frames and also the parts $6^b$, which are surrounded by slots.

The chains 2 extend from the eyes 20 at the ends of the front cross-bar 4 of the one table to the eyes 20 of the front cross-bar of the adjacent table and from the eyes 20 of the back cross-bar of the one table to the eyes of the back cross-bar of the adjacent table. In this manner the front cross-bars of all the tables are connected together and likewise the back cross-bars of all the tables.

The tables are fed forward in succession by means of two endless chains 21 21, running upon chain-wheels 22, mounted on the cross-shafts 23 23, which at the ends are carried in the central part $6^a$ of the side frames 6. The endless chains have lugs 24, which are capable of catching on the rear cross-bars 4 of the tables. The left-hand shaft 23 (see Fig. 1) is rotated by means of the chain-gear 25 26 27 from a rotating sleeve carried on the stay 18, and this sleeve is actuated by means of the chain-gear 28 29 30 from the main shaft 31, which latter is carried in bearings in the central part $6^a$ of the side frames 6 6 and is revolved by means of belt-pulleys 32 from any suitable prime mover. The tables are caused to circulate first forward along the horizontal slots 7 into position below the cutting-knives and then to remain stationary until the knives and benders have performed their work, then to move out from under the knives and benders toward the left hand, Fig. 1, then to move down the curved slots 8 10, (see Figs. 1 and $1^a$,) then to move back along the horizontal slots $7^a$, and then up again along the curved slots 9 11 into their original position ready to be fed forward again. As the tables are all connected together by the chains, the feeding of the one table forward by means of the lugs 24 causes the other tables also to move. The tables while being circulated always remain in the horizontal position, as they are held in position by the chains 2 and the buttons 5, which travel along the slots in the side frames.

The switches 12 13 at each side of the machine are provided in order to guide the buttons into their proper slots. The switches 12 have three arms $a\ b\ c$, as clearly shown at Fig. 1, and pivoted upon the pins 33 of the side frames 34 are stop-pins for the arms of the switches. 35 is a spring secured at one end to the frame and at the other end a little above the center of the star-shaped switch. This spring as the switch moves from side to side is thrown over the center, so that it holds the switch in the position to which it is moved. When a table traveling along the slots 7 of the side frames moves forward from under the cutting-knives, it is necessary that its front buttons 5 should pass over the slots 8, and this they are caused to do by the arms $b$ of the star-shaped switches 12, which guide the ends of the front cross-bar 4 of the table over the slots 8. When the front cross-bar passes over the slots 8, it knocks down the arm $a$ of each switch 12, so that the said arm $a$ moves down into the horizontal position, while the arm $b$ is raised up into the inclined position at the rear of the front cross-bar 4. Each switch 12 is held in this new position by means of its stop-pins 34 and spring 35. The front cross-bar 4 as the table moves forward passes over the arms $a$ of the switches 12, while as the table advances its rear cross-bar eventually strikes against the now inclined arms $b$ and by them is guided into the slots 8. As the bar moves along the slots 8 it comes in contact with the arm $c$ of the switches 12 and knocks these switches back again into their original position, as shown at Fig. 1. It will be thus seen that the switches 12 guide the buttons 5 into their proper slots. The switches 13 act in a similar manner for the buttons of the table which is about to pass up the slots 9. The hinged guides 14 allow the front buttons of each rising table to pass freely into the slots 7, while they guide the rear buttons of the same table along the slots 7 after the table has been raised into the up position.

$2^a$ represents guide-pulleys for the chains 2.

The material for the body of each box is laid upon the block 36, while the material for the lid of each box is laid upon the block 37 of the top table 1. In the machine I may cut a number of blanks at a time, so that a number of sheets of leather-board would be laid together on the table in order to be cut and bent. After the sheets are properly laid upon the table the latter is fed forward by the lugs 24 in the manner hereinbefore described to the center of the machine in order that the material may be acted upon by the cutters and benders.

The cutting mechanism for the box-bodies consists of a vertically-reciprocating frame 38, which is connected to slide-bars 39, working in guide-brackets 40. The upper ends of the slide-bars 39 are connected by connecting-rods 41 to cranks 42 on the shaft 43, which latter is driven by means of the belt 44 and pulley 45 from the pulley 46 on the main shaft 31.

47 represents hangers for carrying the shaft 43. These hangers are bolted to a rectangular frame 48, (see also Fig. 3,) which is supported by eight pillars $49^b$ on the rectangular frame 50ᵃ, which latter is supported by the side frames 6.

For cutting the shape of box-blank shown in Fig. 13 there are four outside knives 49 and eight small inside knives 50, which are arranged in the manner shown in the diagram Fig. 12. Each knife 49 is made of the flattened V shape shown in Fig. 22 and is secured to holders 51, (see also Figs. 20 and 21,) which latter are of L shape in plan (see Fig. 4) and secured by the sliding collars 52 to the bars 53, which pass diagonally through the corners of the frame 38. By sliding the collars 52 along the diagonal bars 53 they can be adjusted in or out, as desired, and be clamped in the adjusted position by means of the clamping-screws 54, which latter can be made to enter any of the holes 53ᵃ in the bars. The outer end of each diagonal bar works as the frame 38 reciprocates in a guideway made in the pillars 49ᵇ. For the purpose of steadying and guiding the diagonal bars in their movements vertical slotted guides 55 are provided, which at their upper ends have rollers 56 running upon the diagonal rails 57, fitted to the upper frame 48. These slotted guides, which are suspended from the rails, can be moved in and out on the rails, as desired, by means of screwed rods 58, working through nut-heads 59 on the guides. The screwed rods 58 are revolved, so as to cause the guides 55 to move, by means of bevel-gears 60 from the screwed rods 61, which latter are revolved by the hand-wheels 62. 63 63 are central supports carried by the rails 57 for the rods 58 61. 64 represents bearings for the rods.

It may be mentioned that the small slotting-knives 50 are secured to the cross-bars 51ᵃ 51ᵇ, which latter are secured to the knife-holders.

The benders 65 66, which are arranged in the manner indicated by the dotted lines in the diagram Fig. 12, are attached to holders 67, of a T shape, as shown at Figs. 14 and 15, and the construction of which will be hereinafter more fully described. These holders, of which there are four, are adjustably secured, by means of sliding collars 69 and clamping-screws 70, to a cross-frame 71, rigidly attached to a pillar 72, as clearly shown in the detail view Fig. 23. As shown at Fig. 2, the pillar 72 has guides 73, which slide in guideways 74 in the uprights 75, which latter are rigidly attached at their upper ends to the rails 57. 49ᵃ represents binding-rings at the lower end of the uprights. The pillar 72 is connected at its upper end by the connecting-rod 76 to the crank 77 of the shaft 43 and is reciprocated vertically. As will be seen, the cranks for actuating the connecting-rods 41 are set in advance of the crank 77, so that the cutters perform the cutting operation just before the benders descend to perform the bending or creasing operation.

Each bender consists of a creasing-knife 65, having a cross-head 79, (see Figs. 14, 16, and 17,) made one with it, and this head has two longitudinal grooves 80 81, in which blocks 82 83 are slidably fitted. Each pair of blocks 82 are connected together by a curved spring 84, while each pair of blocks 83 are connected together by a curved spring 85, and these springs 84 85 are secured by pins to the body of the holder 67. As will be seen at Figs. 14 to 17, the holder consists of a rectangular-shaped upper part with a downwardly-projecting footpiece 67ᵃ, to which a bar 89 is fitted, said bar constituting a ledge upon which the head 79 can rest. Each bender-knife 65, with its cross-head 79, is first inserted in its holder from below and then held securely in place by means of the L-shaped side frame-plates 86 and the bar 89, which latter is secured in place by studs 90, while the former are secured in place by the studs 91. The bender-knives 65 to a certain extent can move vertically (against the action of the cushioning-springs 84 85) within the body of the holder. Each holder has a recess or space left at the part 88, so that its adjoining cutting-knife 50 can work close up to the bender and make the proper length of cut in the material, which could not otherwise be done.

The lid-blanks to be cut and bent are laid, as before stated, on the block 37 of the top table, and they are cut and bent by mechanism constructed and operating in precisely the same manner as the mechanism for cutting and bending the blanks for the box-bodies. The lid cutting and bending mechanism is shown at the right-hand side of Figs. 2 and 4 and consists of knives 92, benders 93, knife-holders 94, bender-holders 95, a cross-shaped frame 96 for operating the benders actuated from the crank 97, diagonal bars 98 for supporting the knife-holders, a frame 99 for carrying the bars 98, slide-bars 100, connected to the frame, cranks 101 for actuating the slide-bars, guides 102 for the bars 98, and the screw-rods 61 for operating these guides.

Fitted to the knife-holders 51 and 94 are small brackets 103, (see Fig. 12,) in which punches 104 are removably fitted. These punches work along with the knives and punch the holes in the blanks through which the usual studs are passed for binding up the finished boxes. The construction of punch I prefer to use in my machine is clearly shown at Figs. 9 and 10. Each punch consists of a hollow cutting-tube 105, which is tapered at its upper end 106. This tube is screwed into a conic receptacle 107, which is screwed to the base 108 of the holder 109, which latter is square, so as to fit into a square hole in its bracket 103. The punch is secured removably in place in its bracket 103 by means of the screw 110, which enters a partially-tapped hole 111 in the holder. Owing to the construction of the punch the cut-out pieces of material automatically ascend up the interior of the tube 105 and fall over its upper end into the receptacle 107, where they collect and can be easily removed from time to time by screwing off the receptacle. When the tube 105 is worn, it can be screwed out of place and replaced by another one.

In order that different sizes of blanks may be operated upon in the machine, it is necessary to provide means whereby the tables and also the knives and benders can be readily expanded and contracted. Each table 1 is made in eight parts or sections—four parts 112 for the body-blanks and four parts 113 for the lid-blanks. Each part at its under side (see Fig. 6) has two straps 114 and one strap 115, and through the straps 114 flat guide-bars 116 pass, while through the straps 115 flat guide-bars 117 pass. The ends of the guide-bars 116 work in grooves 118, (see Figs. 5, 7, and 8,) made in the ends of the casing 3 of the table, while the ends of the guide-bars 117 are provided with stop collars or flanges 119. Each part is hollowed or recessed, as shown at Figs. 7 and 8, for the reception of the cutting-blocks 36 37, which latter are merely laid in place. The parts may be connected together by means of springs 120. The mechanism for opening the parts or sections—that is, moving them apart from one another—and for closing them or bringing them together consists of four screwed spindles 121 122 123 124, the spindles 121 122 being coupled together at 125, while the spindles 123 124 are arranged at right angles to them. Each spindle is cut with a right and left hand screw-thread, as shown. The spindles 121 122 have worms 127 on them, while the spindles 123 124 have worm-wheels 128 on them gearing with said worms. The threaded parts of the spindles 121 122 work in screwed nuts 129, secured to the bars 117, while the threaded parts of the spindles 123 124 work in screwed nuts 130.

131 is a wheel with handle for turning the screwed spindles 121 122. As will be readily understood, when this wheel 131 is turned in one direction the bars 116 are caused to approach one another, their ends sliding in the grooves 118 of the casing 3, while the cross-bars 117 of each pair are caused to simultaneously approach one another. This movement of the bars 116 117 causes the parts 112 113 of the table to approach one another, thereby reducing the area of the table. In like manner by turning the wheel 131 in the opposite direction the parts of the table can be caused to expand or move away from one another. When the parts have been adjusted in their proper positions by turning the wheel 131, so as to give the desired size of table, the blocks 36 37 are inserted in place. A set of blocks of different sizes is supplied with the machine, and the proper blocks 36 37 are according to the size of the table inserted in place. Each block is made with vertical slots 132, through or into which the cutting-knives can pass when cutting the blanks. The central part of each cutting-block surrounded by the slots is held in place by metal bars 133, (indicated in dotted lines at Fig. 5,) secured at intervals apart on the bottom of the block. The face or upper surface of the central part of each block is made with a number of V-shaped grooves 134, arranged at right angles to one another, as shown at Figs. 24 and 25. These grooves enable the benders to properly bend the leather-board blanks by providing spaces for the boards to sink into when being bent.

The knives and benders have to be expanded and contracted in exactly the same degree as the tables, and this is done for the body portion by sliding the collars 52 of the knife-holders along the diagonal bars 53 and the collars 69 of the bender-holders 67 along the bars 71. The holders are clamped in the proper positions by means of the clamping-screws 54 70. The holders for the knives and benders of the lid portion are adjusted in a similar manner by sliding their collars along the bars 98 and 96 and clamping them in the proper position. When the holders are contracted for operating on the smallest size of blank, their ends butt against one another; but when they are opened out for operating on a larger size of blank gaps or spaces are left between their ends. These gaps are bridged by means of rectangular bars 135, (see Figs. 18 and 19,) which work telescopically in the rectangular recesses 87 of the holders. Distance-pieces 136 of a trough shape are adapted to fit over the bars 135, and when fitted in place they cover the bars 135 and prevent lateral play of the holders. Each distance-piece may be removably secured to its bar 135 by means of a screw 138. Distance-pieces would be kept in stock of various lengths to suit the different sizes of blanks to be cut and the consequent variations in the size of the knives and benders. It may be here stated that each time a different-sized blank has to be cut and bent the holders are adjusted accordingly, and then knives and benders of the proper lengths are secured to the holders. Complete sets of knives and benders would be kept in stock to suit the various sizes and kinds of blanks to be cut and bent.

The diagonal bars 53 98 and the cross-bars 71 96 may be made capable of being extended or reduced in length by making them in two or more sections and connecting these sections together by means of telescopic bars and distance-pieces in much the same manner as the holders for the knives and benders. In Fig. 4, 136$^a$ indicates such distance-pieces for the bars 98. The telescopic bars would in this case be securely fastened in place after being adjusted.

The mechanism for holding each table in position as it comes under the cutters and benders consists of two stop-bars 139, working in guide-brackets 139$^a$, (see Figs. 1, 3, and 4,) which are raised and lowered at the proper times, so as to check the table and hold it in position during the cutting and bending operation and thereafter allow it to pass forward by means of links 140, jointed at their upper ends to levers 141, fulcrumed on the bar 142, carried by the brackets 143, which latter are secured to the frame 48. The brackets carry in bearings a short shaft 144, which is driven, by means of a pulley 145 and belt 146, from a pulley 147 on the main shaft 43. Cams 148 on the shaft 144 act on the rollers 149 of the levers 141, so as to depress the short ends of said levers, and thereby raise up the stop-bars 139 when the tables are about to move forward. The cams are so shaped that each time they retain the stop-bars in the up position until the top table has moved forward sufficiently far to clear, when they allow the stop-bars to fall down again by their own weight.

In conjunction with the mechanism for expanding and contracting the tables suitable gages may be provided for indicating the amount of the expansion and contraction. One of these gages may be secured at the back of each table, and it may take the form, as shown to an enlarged scale at Fig. 11, of a graduated bar 150, secured to the casing 3 of the table in a suitable position. Below the graduated bar is a screwed spindle 151, having a traveling nut 153 on it, which is made one with an indicator or pointer 152, which latter can travel along the graduated bar. The screwed spindle 151 may be revolved so as to travel along by means of chain-gear 154 from the spindle 122 of the table.

If desired, an automatic recorder of any suitable and well-known construction may be fitted on the machine for the purpose of recording the number of boxes made by the machine.

The details of construction of the machine may be altered or modified without departing from the principle of the invention.

Having now fully described my invention, what I claim, and desire to secure by Letters Patent, is—

1. The combination in a machine for manufacturing cardboard and leather-board boxes of a frame, a series of traveling tables arranged to circulate vertically in the frame, means for operating the tables, vertically-reciprocating knives arranged above the tables, vertically-reciprocating benders arranged above the tables, and means for reciprocating the knives and benders, substantially as described.

2. The combination in a machine for manufacturing cardboard and leather-board boxes of a frame, a series of traveling tables connected together by chains working in the frame, slots in the frame along which the tables travel, guide-buttons secured to the tables and adapted to work in said slots, means for operating the tables, vertically-reciprocating knives arranged above the tables, vertically-reciprocating benders arranged above the tables, and means for reciprocating the knives and the benders, substantially as hereinbefore described.

3. The combination in a machine for manufacturing cardboard and leather-board boxes of a frame, a series of traveling tables connected together by chains working in the frame, horizontal slots 7, 7ª in the frame, curved slots 10, 9, 8, 11 connecting the horizontal slots, guide-buttons secured to the tables and adapted to work in said slots, means for switching the tables into their proper slots as they travel along, means for operating the tables, vertically-reciprocating knives arranged above the tables, vertically-reciprocating benders arranged above the tables, and means for reciprocating the knives and the benders, substantially as hereinbefore described.

4. The combination in a machine for manufacturing cardboard and leather-board boxes of a frame, a series of traveling tables connected together by chains working in the frame, horizontal slots 7, 7ª in the frame, curved slots 8, 9, 10, 11 connecting the horizontal slots, guide-buttons secured to the tables and adapted to work in the said slots, three-arm switches 12, 13 for guiding the tables into the slots 8, 9, stop-pins 34 for the switches, springs 35 for the switches, means for operating the tables, vertically-reciprocating knives arranged above the tables, vertically-reciprocating benders arranged above the tables, and means for reciprocating the knives and the benders, substantially as hereinbefore described.

5. The combination in a machine for manufacturing cardboard and leather-board boxes of two side frames 6, 6, a rectangular frame 50ª supported by the side frames, a rectangular frame 48 supported upon the frame 50ª by means of pillars 49ᵇ, slots 7, 7ª, 8, 9, 10, 11 made in the side frames, an endless chain of tables each provided with pivoted guide-buttons adapted to work in the slots of the frame, means for operating the tables, a crank-shaft 43 carried by the frame 48, means for revolving the crank-shaft, a frame 38 operated by means of guide-bars and connecting-rods from the crank-shaft, a second frame 99 operated by means of guide-bars and connecting-rods from the crank-shaft, a series of cutting-knives for the body of the box secured to the frame 38 a series of cutting-knives for the lid of the box secured to the frame 99, a cross-frame 57 carried by the frame 48, depending guides 75 secured to the said cross-frame, cross-heads 73 actuated by connecting-rods 76 connected to the crank-shaft 43, cross-frames 71 and 96 connected to the cross-heads, and benders connected to the cross-frames, substantially as hereinbefore described.

6. The combination of a machine for manufacturing cardboard and leather-board boxes of two side frames 6, 6, a rectangular frame 50ª supported by the side frames, a rectangular frame 48 supported by the frame 50ª by means of pillars 49ᵇ, guide-slots in the pillars, a crank-shaft carried by the frame 48, means for revolving the crank-shaft, a frame 38 operated by means of guide-bars and connecting-rods from the crank-shaft, a second frame 99 operated by means of guide-bars and connecting-rods from the crank-shaft, diagonal bars 98 fitted in the frame 99 and having their outer ends working in the guide-slots of the pillars 49$^b$, cutting-knives for the lid of the box carried upon the diagonal bars 98, means for adjusting the knives upon these bars, diagonal bars 53 fitted in the frame 38 and whose outer ends work in the guide-slots of the pillars 49$^b$, cutting-knives for the body of the box carried on the diagonal bars 53, means for adjusting the knives upon these bars, a cross-frame 57 carried by the frame 48, depending guides secured to the said frame 57, cross-heads 73 actuated by connecting-rods from the crank-shaft 43, cross-frames 71 and 96 connected to the cross-heads, benders connected to said cross-frames and means for adjusting the benders on the frames, substantially as hereinbefore described.

7. In a machine for manufacturing cardboard and leather-board boxes, a table consisting of a casing, adjustable pieces fitted within the casing, recesses made in the pieces, guide-bars 116 working in the casing, guide-bars 117 connecting the adjustable pieces together, screw-rods 123, 124 connecting the guide-bars 116 together, nuts on the guide-bars 116 through which the screwed ends of the rods 123, 124 pass, a screwed rod 121, 122 working through nuts on the guide-bars 117, means for revolving this rod and worm-gearing for actuating the rods 123, 124 from the rod 121, 122, substantially as described.

8. In a machine for manufacturing cardboard and leather-board boxes, a table consisting of a casing, adjustable pieces fitted within the casing, recesses made in these pieces, means for expanding and contracting the pieces simultaneously and cutting-blocks adapted to fit into the recesses of the adjustable pieces, substantially as hereinbefore described.

9. In a machine for manufacturing cardboard boxes a bender 65 having a head 79, a holder therefor, head 79 having grooves in its top, blocks in such grooves and springs between the holder and said blocks.

10. In a machine for manufacturing cardboard and leather-board boxes, the combination of a frame vertically-reciprocating knives and benders working in the frame, means for reciprocating the knives and benders, diagonal bars to the knives and reciprocating therewith and depending guides for guiding the diagonal bars said depending guides being capable of adjustment in and out by means of screws actuated by hand-wheels said screws working through nut-heads at the upper ends of the depending guides, substantially as hereinbefore described.

Signed at Glasgow, Scotland, this 26th day of January, 1900.

W. L. JACKSON.

Witnesses:
 WILLIAM GALL,
 THOMAS GRACE.